United States Patent [19]

Cooper

[11] Patent Number: 4,999,005
[45] Date of Patent: *Mar. 12, 1991

[54] WIDE BAND COLOR CORRECTING INFRARED LENS SYSTEM

[76] Inventor: Erwin E. Cooper, 1510 Northridge, Carrollton, Tex. 75006

[ * ] Notice: The portion of the term of this patent subsequent to Oct. 3, 2006 has been disclaimed.

[21] Appl. No.: 259,822

[22] Filed: Oct. 19, 1988

[51] Int. Cl.$^5$ .......................... G02B 3/00; G02B 9/12
[52] U.S. Cl. ...................................... 350/1.4; 350/474
[58] Field of Search ................... 350/1.1, 1.2, 1.3, 1.4, 350/501, 463, 474, 475; 362/326, 330, 331, 332, 333, 334

[56] References Cited

U.S. PATENT DOCUMENTS

| | | | |
|---|---|---|---|
| 3,778,133 | 12/1973 | Tatian | 350/2 |
| 4,397,520 | 8/1983 | Neil | 350/1.4 |
| 4,679,891 | 7/1987 | Roberts | 350/1.3 |
| 4,714,307 | 12/1987 | Palmer | 350/1.3 |
| 4,871,219 | 10/1989 | Cooper | 350/1.4 |

OTHER PUBLICATIONS

Jamieson, "Ultra-Wide Waveband Optics", *Proceedings of SPIE*, vol. 430, 1983, pp. 163–171.

*Primary Examiner*—Bruce Y. Arnold

[57] ABSTRACT

An infrared refractive lens triplet having color correcting properties for radiation within the 3 to 13 micrometer spectral band. In certain embodiments of the invention the triplet is capable of simultaneously focusing radiation in the 3–5 micrometer and the 8–12 micrometer atmospheric windows for imaging about a single focal plane. In these embodiments one lens comprises germanium and another is formed of materials selected from the group consisting of sulfides and selenides of zinc and combinations thereof. A third lens is a glass characterized by chromic properties corresponding approximately to

$$40 < V < 46$$

with $$V = (N_D - 1)/(N_{13} - N_3),$$

wherein:
$N_D$ is the refractive index at 8 micrometers,
$N_{13}$ is the refractive index at 13 micrometers, and
$N_3$ is the refractive index at 3 micrometers.

43 Claims, 5 Drawing Sheets

WIDE BAND COLOR CORRECTING INFRARED LENS SYSTEM

FIELD OF THE INVENTION

This invention relates to refractive lens systems and, more particularly, to an apochromatic lens systems suitable for operation through the entire 3 to 12 micron spectral band.

BACKGROUND

Imaging devices, search and track sensors and other types of optical devices which operate in the 3 -12 micrometer spectral region employ either reflective or refractive objective lens systems. An advantage of reflective optics is that wide spectral band operation is achievable. However, reflective optical systems have several undesirable features such as, for example, limited field of view and large physical size. In addition, central obscurations limits the diffraction modulation transfer function (MTF).

In the past refractive lens systems operating in the 3 -12 micrometer band have been designed for limited ranges, e.g., either the 3 -5 or the 8 -12 micrometer atmospheric windows. This is because the refractive indices of component lens materials vary significantly between the two atmospheric windows. For example, germanium, a common lens material for the 8 -12 micrometer wavelengths, operates like a "crown" in this portion of the spectrum while exhibiting characteristics of a "flint" in the 3 -5 micrometer region. Generally, the prior art has avoided dual range refractive optics because apochromatic systems designed for operation in one window have exhibited intolerable chromic aberrations in the other window.

The spectral sensitivities of infrared detectors and focal plane imaging devices are generally greater than the operating ranges of available refractive lens systems. This increased spectral sensitivity can be utilized at short ranges or high altitudes where atmospheric absorption is not a problem, but such applications have required use of reflective optics thereby imposing the above-mentioned limitations in wide band systems. It would be advantageous to provide a refractive lens system which is not limited to small bandwidths within the 3 -13 micrometer range.

SUMMARY OF THE INVENTION

It is therefore desirable to form a refractive lens system providing improved color correction in the 3 -13 micrometer range.

Accordingly there is provided an infrared refractive lens triplet having color correcting properties for radiation within the 3.5 to 12 micrometer spectral band. In certain embodiments of the invention the triplet is capable of simultaneously focusing radiation in the 3.5 -5 micrometer and the 8 -12 micrometer range for imaging about a single focal plane. In these embodiments one lens comprises germanium and another is formed of materials selected from the group consisting of sulfides and selenides of zinc and combinations thereof. A third lens is characterized by chromic properties corresponding approximately to $$40 < V < 46 \text{ ps}$$

with $V = (N_D - 1)/(N_{13} - N_3)$, ps wherein:

$N_D$ is the refractive index at 8 micrometers,
$N_{13}$ is the refractive index at 13 micrometers, and
$N_3$ is the refractive index at 3 micrometers.

An object of the invention is to provide a lens system which includes sufficient axial color correction to permit use of common optics for imaging all radiation in the 3 -12 micrometer range.

It is a further object of the invention to provide a lens triplet with minimal axial color aberration such that all of the radiation in the 3 -12 micrometer range may be focused upon a common detector array.

BRIEF DESCRIPTION OF THE DRAWINGS

The invention may best be understood by reference to the following detailed description when read in conjunction with the following drawing, wherein.

Certain preferred embodiments of the invention are disclosed herein. However, it should be appreciated that the specific materials, lens formulations and systems applications disclosed herein are merely illustrative and do not delimit the scope of the invention.

DESCRIPTION OF PREFERRED EMBODIMENTS

Figure 1:
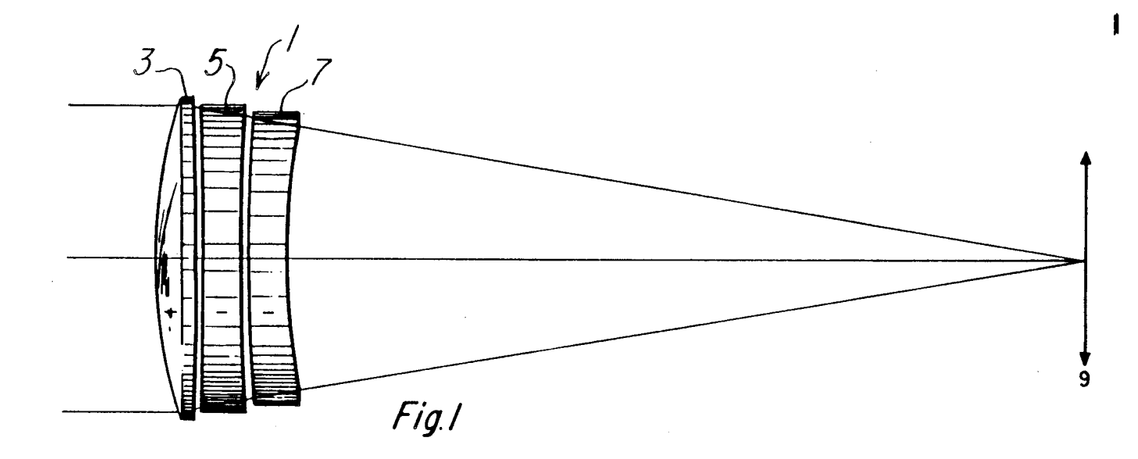
FIG. 1 illustrates a wide band objective lens triplet according to the invention.

FIG. 1 illustrates a wide band objective lens triplet 1 according to the invention comprising a lens 3 formed of chalcogenide glass, a lens 5, preferably formed of germanium, and a lens 7 preferably formed of a zinc chalcogenide, e.g., zinc selenide or zinc sulfide. In the preferred embodiments the first lens 3 is positive and the second and third lenses are negative. As further illustrated in FIG. 1 collimated light impinging upon the triplet 1 is focused at an imaging plane 9 about which may be positioned a focal plane detector array such as the type used in a forward looking infrared imaging device.

A feature of the lens triplet 1 is that color correction throughout the entire 3 -12 micrometer range, or the 3.5 -13 micrometer range is sufficient to permit use of common optics for processing the incoming radiation. For example, radiation passing through the triplet 1 may be broken into two paths with a beam splitter such that radiation in the 3 -5 micrometer atmospheric window can be received in a first focal plane for processing by a first detector array while radiation in the 8 -12 micrometer atmospheric window can be received for processing by a second detector array in a second focal plane.

Moreover, in preferred embodiments of the invention the lens triplet 1 is formulated such that the resulting axial color correction is sufficient to permit imaging all of the radiation in the 3 -12 micrometer range upon a common detector array. That is, axial color aberration does not have a dominant influence on the overall size of the image blur when compared to other aberrations caused by the optical system. Alternately, the lens powers may be formulated to simultaneously focus all radiation in the 3.5 –13 micrometer range for imaging about a single focal plane.

The first lens 3 of the triplet 1 is formed of a material for which $40 < V < 46$, where $$V = (N_D - 1)/(N_{13} - N_3),$$

$N_D$ is index at 8 micrometers; $N_{13}$ is the refractive index at 13 micrometers; and $N_3$ is the refractive index at 3 micrometers. The second lens 5 is germanium and the third lens 7 is a zinc chalcogenide.

In preferred embodiments the first lens 3 is a chalcogenide glass and the third lens is zinc sulfide or zinc selenide. The third lens 7 could also be a ternary composition comprising zinc, sulfur and selenium.

In a first exemplary formulation of the triplet 1, the first lens is formed of Texas Instruments 20 glass (TI-20) and the third lens 7 is formed of zinc selenide. TI-20 is a ternary glass composition according to the formula $Ge_{33}AS_{12}SE_{55}$, also sold under the trade name AMTIR-1. In the 3 –13 micrometer range $$V_{(TI-20)} (N_D - 1)/(N_{13} - N_3) = 44.6.$$

According to the first formulation of the triplet 1, the first lens 3 is a positive element; the germanium lens 5 is a negative element having a power ranging from about 0.2 to about 0.3 that of the first lens 3; and the selenide lens 7 is a negative element having a power ranging from about 0.5 to 0.6 times that of the first lens 3. To form an on-axis objective the power of the germanium lens 5 is 0.24 that of the the first lens 3 and the power of the selenide lens 7 is 0.52 that of the first lens 3. The order of the lenses may be varied from that illustrated in FIG. 1.

Figure 2A:
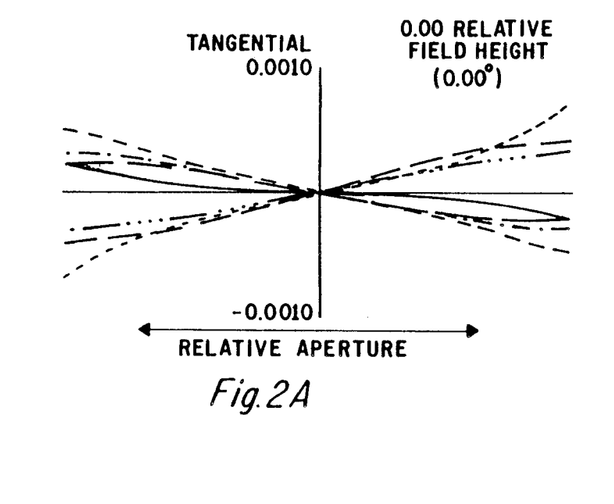
FIGS. 2A and 2B illustrate respectively, for a first formulation of the FIG. 1 lens triplet, resulting on-axis tangential and sagittal ray fans.
Figure 2B:
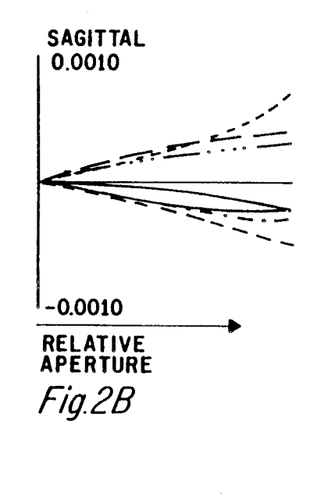

Based on the preferred lens powers of the first formulation Table 1 provides corresponding lens radii, thicknesses and lens separation distances for each lens surface. Surface numbers correspond to sequential numbering of the FIG. 1 lens surfaces from left to right, i.e., referencing the outside surface of the first lens 3 as surface 1 and referencing the outside surface of lens 7 as surface 6. Surface 7 corresponds to the focal plane.

length is scaled in inches relative to the point of intersection of the chief ray in an image plane. The horizontal axis is a measure of radial distance along the aperture such that the most extreme point of each curve corresponds to the aberration of the marginal ray passing through the first lens 3. Because of symmetry only half of the sagittal ray fan is shown in FIG. 2B. The ray fan for each wavelength is identifiable according to the legend, expressed in nanometers (NM), provided with the figure. It can be seen from FIG. 2 that the amount of aberration is relatively small.

The first formulation may be modified by changing the ternary composition of the first lens 3 according to the general formula $Ge_XAs_YSe_Z$. In another variation of the triplet 1 better color correction is obtained by forming the third lens 7 with zinc sulfide. However, combinations which include a zinc sulfide lens may be less desirable because zinc sulfide is absorptive in the 10 –12 micrometer region.

In a second exemplary formulation of the triplet 1, the first lens is a positive element formed of Texas Instruments 1173 glass (TI-1173); the second lens is a negative element formed of germanium and the third lens 7 is a negative element formed of zinc sulfide. TI-1173 is a ternary glass composition according to the formula $Ge_{28}Sb_{12}Se_{60}$ and is also sold under the trade name AMTIR-3. In the 3 –13 micrometer range $$V_{(TI-1173)} = (N_D - 1)/(N_{13} - N_3) = 43.$$

It is noted that the ternary composition of the first lens 3 may be varied according to the general formula $Ge_X As_Y Se_Z$ such as disclosed in U.S. Pat. No. 3,360,649 which is herein incorporated by reference.

According to the second formulation the germanium lens 5 has a power ranging from about 0.40 to about 0.48 that of the first lens 3; and the sulfide lens 7 has a power ranging from about 0.18 to 0.26 times that of the first lens 3. For an on-axis objective the power of the germanium lens 5 is 0.44 that of the the first lens 3 and the power of the sulfide lens is 0.22 that of the first lens 3. The order of the lenses may be varied.

Based on the preferred lens powers Table 2 provides corresponding lens radii, thicknesses and lens separation distances for each lens surface in the second formulation. As noted with regard to Table 1, the surface numbers for the second formulation correspond to sequential numbering of the FIG. 1 lens surfaces from left to right and surface 7 corresponds to the focal plane.

TABLE 1

| SURFACE NUMBER | RADIUS (INCHES) | LENS THICKNESS (T) OR SEPARATION (S) (INCHES) | LENS MATERIAL |
|---|---|---|---|
| 1 | 18.89064 | 0.550000 (T) | TI-20 |
| 2 | −13.66169 | .005000 (S) | |
| 3 | −13.28423 | 0.300000 (T) | GERMANIUM |
| 4 | −17.60111 | 0.005000 (S) | |
| 5 | −23.04041 | 0.250000 (T) | ZINC SELENIDE |
| 6 | 54.20512 | 20.499780 (S) | |
| 7 | — | 0.000905 (T) | |

For this first formulation, FIGS. 2A and 2B illustrate, respectively, the resulting on-axis tangential and sagittal ray fans for transmitted radiation in the 3 –12 micrometer wavelength region. Ray aberration for each wavelength

TABLE 2

| SURFACE NUMBER | RADIUS (INCHES) | LENS THICKNESS (T) OR SEPARATION (S) (INCHES) | LENS MATERIAL |
|---|---|---|---|
| 1 | 6.98495 | 0.500000 (T) | TI-1173 |
| 2 | −210.50744 | 0.100000 (S) | |
| 3 | −121.68706 | 0.500000 (T) | GERMANIUM |

TABLE 2-continued

| SURFACE NUMBER | RADIUS (INCHES) | LENS THICKNESS (T) OR SEPARATION (S) (INCHES) | LENS MATERIAL |
| --- | --- | --- | --- |
| 4 | 34.79984 | 0.100000 (S) | |
| 5 | 24.60141 | 0.500000 (T) | ZINC SULFIDE |
| 6 | 10.65889 | 10.210867 (S) | |
| 7 | — | −0.002418 (T) | |

Figure 3:
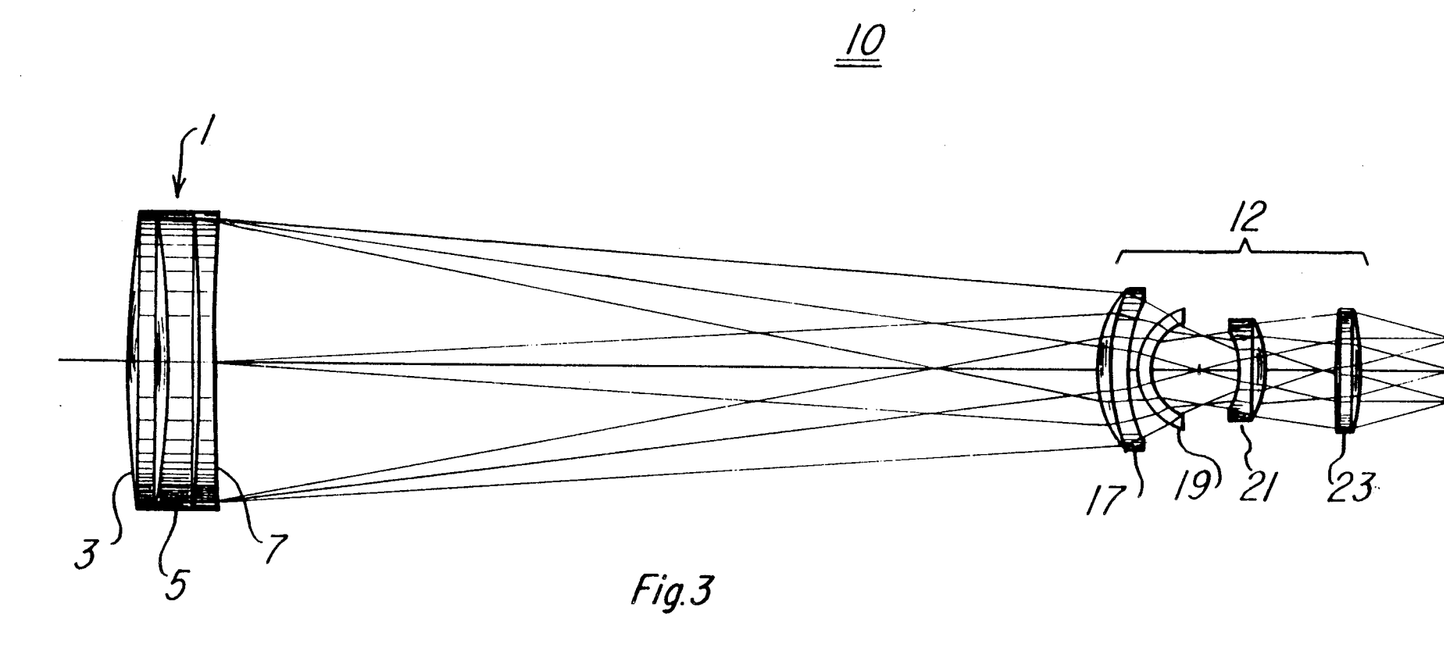
FIG. 3 illustrates an afocal lens system 10 based on another formulation of the FIG. 1 triplet.

FIG. 3 illustrates an afocal lens system 10 based on a variation of the second formulation of the triplet 1. In addition to the triplet 1 the system 10 includes a short focal length lens group 12 which provides lateral color correction. The power ratios of the triplet 1 differ from the preferred ratios of the second formulation in order to correct for axial aberrations introduced by the lens group 12.

The lens group 12 includes a positive lens 17 formed of TI-1173 glass followed by: a negative lens 19 formed of zinc sulfide; a second positive lens 21 formed of TI-1173 glass; and a third positive lens 23 formed of TI-1173 glass. The lens system 10 of FIG. 3 is capable of receiving collimated radiation in the 3 -12 micrometer region and transmitting the collimated radiation at a different magnification. The system 10 has a 4 inch aperture and a 7 degree field of view with a 4.5 power angular magnification.

Figure 4:
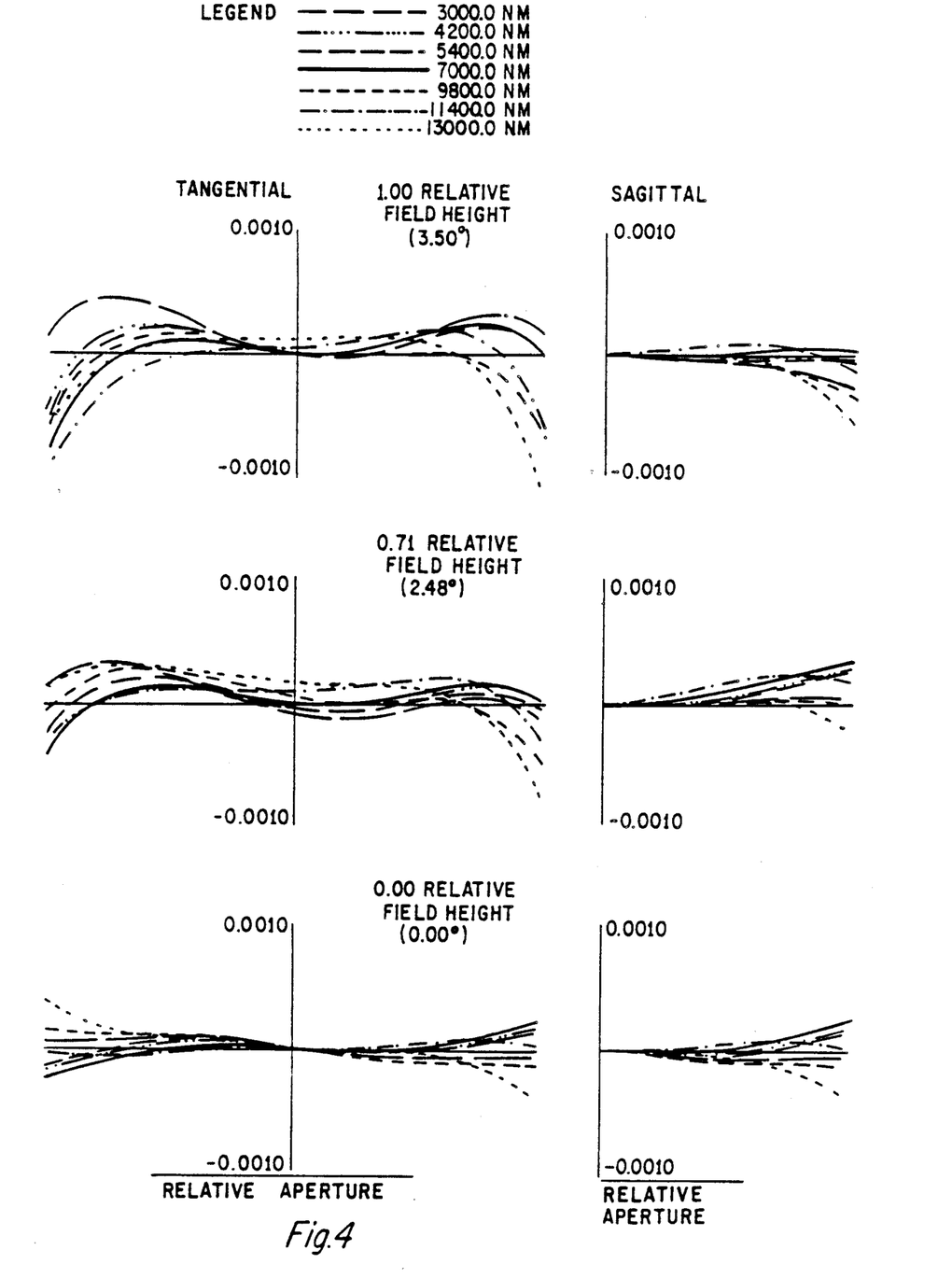
FIG. 4 illustrates on-axis and off-axis tangential and sagittal ray fans for radiation passing through the system of FIG. 3.

Table 3 provides corresponding lens radii, thicknesses and lens separation distances for each lens surface in the system 10. Following the convention used in Tables 1 and 2 the surface numbers for the second formulation correspond to sequential numbering of the FIG. 3 lens surfaces from left to right.

micrometer wavelength region passing through the system 10. Ray aberration for each wavelength is scaled in inches relative to the point of intersection of the chief ray in an image plane. The ray fans of FIG. 4 illustrate that resulting chromic aberrations are sufficiently small to permit use of the system 10 for all wavelengths in the 3–13 micrometer region.

Figure 5:
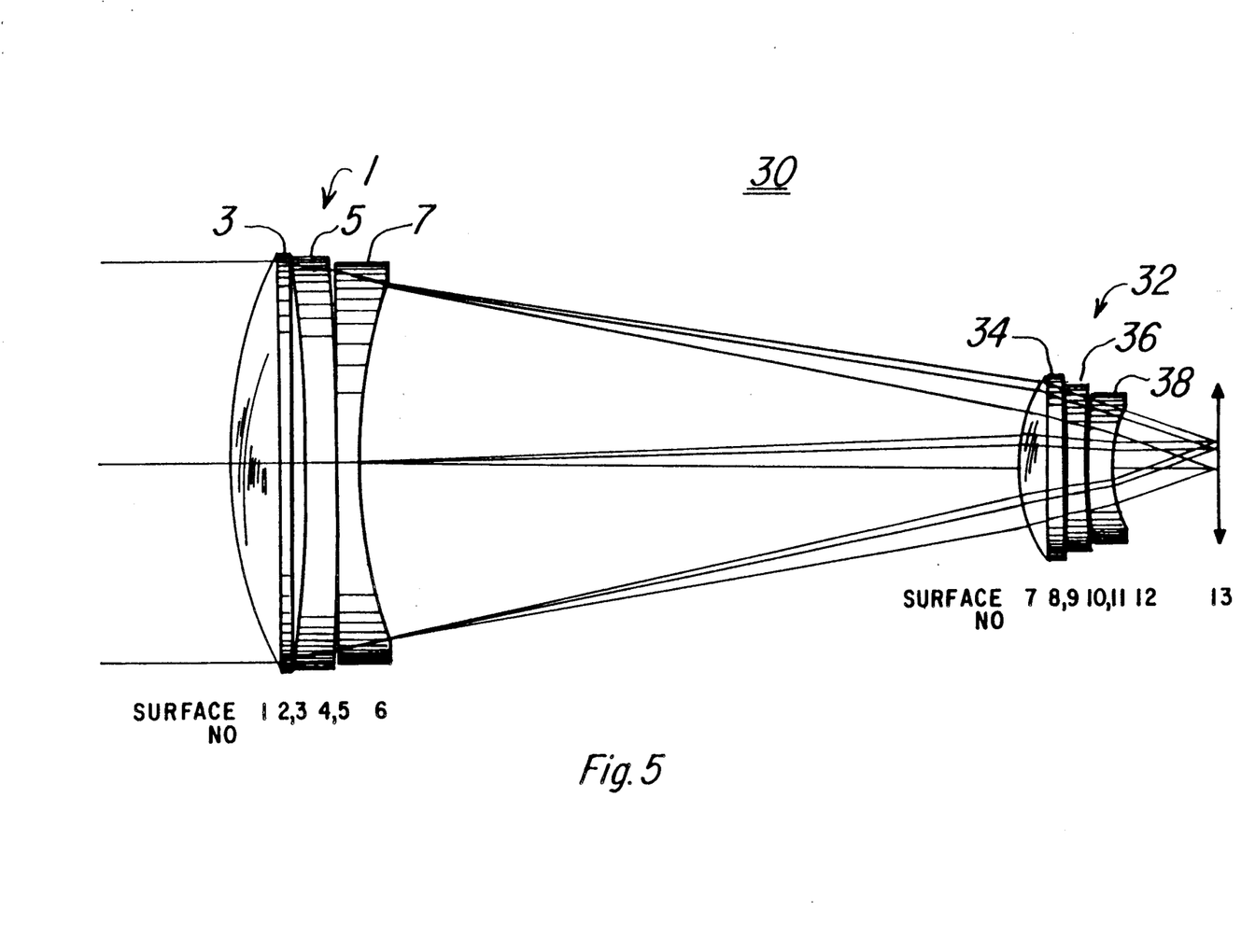
FIG. 5 illustrates an imaging lens system incorporating the triplet of FIG. 1 as the objective portion.

FIG. 5 illustrates an f/1.5 imaging lens system 30 which utilizes the triplet 1 as the objective portion according to a variation of the first formulation. In this example, a second lens group 32, provided to correct for offaxis color aberrations, comprises three optical elements 34, and 38, which also correspond to a variation of the first triplet formulation. The optical powers of the elements 3, 5 and 7 of the first triplet 1 differ from the preferred powers of the first formulation in order to correct for axial color aberrations introduced by the second lens group 32.

Figure 6:
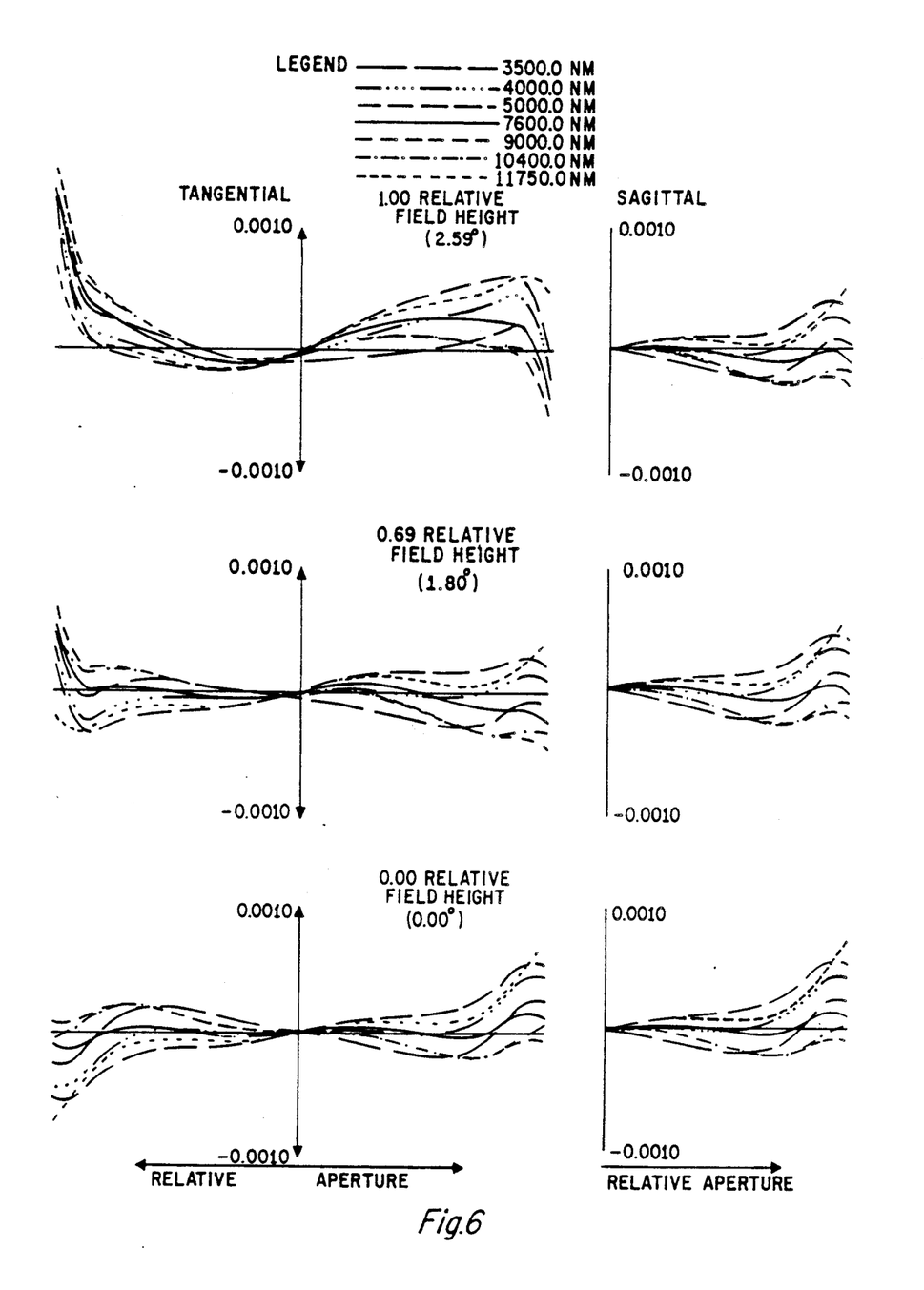
FIG. 6 illustrates on-axis and off-axis tangential and sagittal ray fans for radiation passing through the imaging system of FIG. 5.

Table 4 provides corresponding lens radii, thicknesses and lens separation distances for each lens surface in the system 30 following the convention used in the preceding tables. In a manner similar to that provided in FIGS. 2 and 4 FIG. 6 illustrates on-axis (0.00°) and off-axis (1.80° and 2.59°) tangential and sagittal

TABLE 3

| SURFACE NUMBER | RADIUS (INCHES) | LENS THICKNESS (T) OR SEPARATION (S) (INCHES) | LENS MATERIAL |
| --- | --- | --- | --- |
| 1 | 14.83253 | 0.550000 (T) | TI-1173 |
| 2 | −12.05140 | 0.005000 (S) | |
| 3 | −12.00515 | 0.400000 (T) | GERMANIUM |
| 4 | −22.67097 | 0.005000 (S) | |
| 5 | −35.97152 | 0.250000 (T) | ZINC SULFIDE |
| 6 | 51.47752 | 11.952458 (S) | |
| 7 | 1.71905 | 0.400000 (T) | TI-1173 |
| 8 | 2.30495 | 0.121132 (S) | |
| 9 | 0.83953 | 0.180000 (T) | ZINC SULFIDE |
| 10 | 0.66947 | 0.628459 (S) | |
| 11 | — | 0.588336 — | |
| 12 | −1.07761 | 0.350000 (T) | TI-1173 |
| 13 | −1.30246 | 0.964540 (S) | |
| 14 | 10.84329 | 0.300000 (T) | TI-1173 |
| 15 | −4.64887 | 1.305078 (S) | |
| 16 | — | 1.333330 — | |

Following the convention of FIG. 2, FIG. 4 illustrates on-axis (0.00°) and off-axis (2.48° and 3.50°) tangential and sagittal ray fans for radiation in the 3 -12 ray fans for radiation in the 3 -12 micrometer wavelength region passing through the system 30.

TABLE 4

| SURFACE NUMBER | RADIUS (INCHES) | LENS THICKNESS (T) OR SEPARATION (S) (INCHES) | LENS MATERIAL |
| --- | --- | --- | --- |
| 1 | 5.05853 | 0.700000 (T) | TI-20 |
| 2 | −18.18578 | 0.005000 (S) | |
| 3 | −17.72965 | 0.300000 (T) | GERMANIUM |
| 4 | −47.08812 | 0.005000 (S) | |
| 5 | −150.44950 | 0.250000 (T) | ZINC SELENIDE |
| 6 | 7.02696 | 6.402436 (S) | |
| 7 | 1.71684 | 0.450000 (T) | TI-20 |
| 8 | 64.01631 | 0.005000 (S) | |
| 9 | 134.70714 | 0.220000 (T) | GERMANIUM |
| 10 | 10.51597 | 0.010000 (S) | |
| 11 | 7.28467 | 0.220000 (T) | ZINC SELENIDE |

TABLE 4-continued

| SURFACE NUMBER | RADIUS (INCHES) | LENS THICKNESS (T) OR SEPARATION (S) (INCHES) | LENS MATERIAL |
| --- | --- | --- | --- |
| 12 | 1.56868 | 1.030000 (S) | |
| 13 | — | −0.000656 | |

Certain preferred embodiments of the invention have been described. Various other arrangements and configurations of the disclosed embodiments and components thereof will be apparent when applying the triplet 1 to perform desired functions. Various parameters may be optimized to suit a desired purpose. For example, when the triplet is used in combination with a beam splitter to focus radiation in the 3–5 micrometer range about a different focal plane than the focal plane used for radiation in the 8–12 micrometer range, the lens powers may be varied to further improve color correction within one of these spectral regions. More generally, the color correction requirements are less strenuous when utilizing more than one focal plane. Accordingly, the scope of the invention is only to be limited by the claims which follow.

I claim:
1. An optional system which comprises:
(a) an infrared refractive lens triplet having color correcting properties for radiation ranging from about 3.5 to about 12 micrometers, said triplet comprising:
(b) a first lens having chromic properties corresponding approximately to about $40 < V < 46$, where:
$V = (N_D - 1)/(N_{13} - N_3)$, ps
wherein, for said first lens glass:
$N_D$ is the refractive index at 8 micrometers,
$N_{13}$ is the refractive index at 13 micrometers, and
$N_3$ is the refractive index at 3 micrometers;
(c) a second lens comprising germanium; and
(d) a third lens;
(e) said triplet of lenses being capable of simultaneously focusing radiation in the 3.5 –= micrometer and the 8 –12 micrometer range for imaging about a single focal plane.

2. The system of claim 1 wherein said triplet of lenses is capable of simultaneously focusing radiation throughout the 3.4 to 13 micrometer range for imaging upon a single focal plane.

3. The system of claim 1 wherein the first lens is a chalcogenide glass and said triplet is capable of simultaneously focusing radiation throughout the 3 to 12 micrometer range for imaging upon a single focal plane.

4. The system of claim 3 wherein:
the first lens is a positive element;
the second lens is a negative element having a power between 0.2 and 0.3 that of the first lens; and
the third lens is a negative element having a power between 0.5 and 0.6 that of the first lens.

5. The system of claim 4 wherein the power of the second lens is 0.24 that of the first lens and the power of the third lens is 0.52 that of the first lens.

6. The system of claim 5 wherein the triplet is ordered such that incoming radiation is first received by the first lens and last transmitted by the third lens.

7. The system of claim 3 wherein:
the first lens is a positive element;
the second lens is a negative element having a power between 0.40 and 0.48 that of the first lens; and
the third lens is a negative element having a power between 0.18 and 0.26 that of the first lens.

8. The system of claim 7 wherein the power of the second lens is 0.44 that of the first lens and the power of the third lens is 0.22 that of the first lens.

9. The system of claim 8 wherein the triplet is ordered such that incoming radiation is first received by the first lens and last transmitted by the third lens.

10. The system of claim 1 wherein the first lens is a ternary glass composition comprising germanium, antimony and selenium.

11. The system of claim 1 wherein the first lens glass predominantly comprises geranium, antimony and selenium according to the formula $GE_{28}Sb_{12}Se_{60}$.

12. The system according to claim 1 wherein the first lens is predominantly a ternary glass composition comprising germanium, arsenic and selenium.

13. The system of claim 1 wherein the first lens glass predominantly comprises germanium, arsenic and selenium according to the formula $Ge_{33}As_{12}Se_{55}$.

14. The system of claim 1 wherein the third lens is a chalcogenide.

15. The system of claim 1 wherein the third lens predominantly comprises zinc sulfide.

16. The system of claim 1 wherein the third lens predominantly comprises zinc selenide.

17. The system of claim 1 wherein the first and third lenses are each a chalcogenide.

18. The system of claim 17 wherein the second lens predominantly comprises germanium.

19. The system of claim 1 wherein:
the first lens is selected from the group of glasses consisting of $Ge_xSb_ySe_z$ and $Ge_xAs_ySe_z$; and
the third lens is formed of materials selected from the group consisting of sulfides and selenides of zinc and combinations thereof.

20. The system of claim 1 wherein:
the first lens predominantly comprises germanium, antimony and selenium according to the formula $Ge_{28}Sb_{12}Se_{60}$; and
the third lens predominantly comprises zinc sulfide.

21. The system of claim 1 wherein:
the first lens predominantly comprises germanium, arsenic and selenium according to the formula $Ge_{33}As_{12}Se_{55}$; and
the third lens predominantly comprises zinc sulfide;

22. The system of claim 1 wherein:
the first lens predominantly comprising germanium, antimony and selenium according to the formula $Ge_{28}Sb_{12}Se_{60}$; and
the third lens predominantly comprises zinc selenide.

23. The system of claim 1 wherein:
the first lens predominantly comprises germanium, arsenic and selenium according to the formula $Ge_{33}As_{12}Se_{55}$; and
the third lens predominantly comprises zinc selenide.

24. The system of claim 1 further including a second lens group arranged to provide lateral color correction to radiation transmitted by the triplet, the triplet and second lens group forming an afocal lens system.

25. The system of claim 24 wherein:
the first lens is a positive element having V =43;
the second lens is a negative element having a power between 0.40 and 0.48 that of the first lens;
the third lens is a negative element formed of zinc sulfide and having a power between pb 0.18 and 0.26 that of the first lens; and
the second lens group comprises a positive lens having V=43, a negative lens formed of zinc sulfide, a second positive lens having V=43 and a third positive lens having V=43.

26. The system of claim 1 further including a second lens group arranged to correct for off axis color aberrations and wherein the first lens is a positive element having V=44.6, the triplet and second lens group forming an imaging lens system.

27. The system of claim 26 wherein:
the triplet and second lens group form an f/1.5 imaging lens system;
the second lens is a negative element having a power between 0.20 and 0.30 that of the first lens;
the third lens is a negative element formed of zinc selenide and having a power between 0.50 and 0.60 that of the first lens; and
the second lens group comprises a positive lens having V=44.6, a negative lens formed of germanium and a negative lens formed of zinc selenide.

28. A wide spectral band infrared lens system comprising:
a first lens formed of a ternary composition according to the formula $Ge_X Sb_Y Se_Z$;
a second lens comprising germanium; and
a third lens comprising zinc sulfide, said lens system capable of simultaneously focusing radiation in the 3 –5 micrometer and the 8 –12 micrometer atmospheric windows for imaging about a single focal plane.

29. The system of claim 28 wherein the first lens is formed of a ternary composition according to the formula $Ge_{28}Sb_{12}Se_{60}$.

30. The system of claim 28 wherein:
the first lens is a positive element;
the second lens is a negative element having a power between 0.40 and 0.48 that of the first lens; and
the third lens is a negative element having a power between 0.18 and 0.26 that of the first lens.

31. The system of claim 30 wherein the power of the second lens is 0.44 that of the first lens and the power of the third lens is 0.22 that of the first lens.

32. The system of claim 28 wherein the triplet is ordered such that incoming radiation is first received by the first lens and last transmitted by the third time.

33. A wide spectral band infrared lens system comprising:
a first lens formed of a ternary composition according to the formula $Ge_X As_Y Se_Z$;
a second lens comprising germanium; and
a third lens comprising zincl selenide, said lens system capable of simultaneously focusing radiation in the 3 –5 micrometer and the 9 –12 micrometer atmospheric windows for imaging about a single focal plane.

34. The system of claim 33 wherein the first lens is formed of a ternary composition according to the formula $Ge_{33}As_{12}Se_{55}$.

35. The system of claim 33 wherein:
the first lens is a positive element;
the second lens is a negative element having a power between 0.02 and 0.3 that of the first lens; and
the third lens is a negative element having a power between 0.5 and 0.6 that of the first lens.

36. The system of claim 35 wherein the power of the second lens is 0.24 that of the first lens and the power of the third lens is 0.52 that of the first lens.

37. The system of claim 33 wherein the triplet is ordered such that incoming radiation is first received by the first lens and last transmitted by the third lens.

38. An infrared refractive lens triplet having color correcting properties for radiation ranging from 3 to 13 micrometers, said triplet comprising:
a first lens formed of glass characterized by chromic properties corresponding approximately to 40 < V < 46, $V=(N_D-1)/(N_{13}-N_3)$, wherein for said first lens glass:
$N_D$ is the refractive index at 8 micrometers,
$N_{13}$ is the refractive index at 13 micrometers, and
$N_3$ is the refractive index at 3 micrometers;
a second lens comprising germanium; and
a third lens formed of materials selected from the group consisting of sulfides and selenides of zinc and combinations thereof.

39. The lens triplet of claim 38 wherein the lens powers are formulated to simultaneously focus radiation in the 3 –5 micrometer and the 8 –12 micrometer atmospheric windows for imaging about a single focal plane.

40. The lens triplet of claim 39 wherein said triplet is capable of simultaneously focusing radiation throughout the 3 to 12 micrometer range for imaging upon a single focal plane.

41. The triplet of claim c8 wherein the first lens glass predominantly comprises germanium, antimony and selenium according to the formula $Ge_{28}Sb_{12}Se_{60}$.

42. The triplet of claim 38 wherein the first lens glass predominantly comprises germanium, arsenic and selenium according to the formula $Ge_{33}As_{12}Se_{55}$.

43. The lens triplet of claim 38 wherein the lens powers are formulated to simultaneously focus all radiation in the 3.5 14 13 micrometer range for imaging about a single focal plane.

* * * * *

UNITED STATES PATENT AND TRADEMARK OFFICE
CERTIFICATE OF CORRECTION

PATENT NO. : 4,999,005

DATED : Mar. 12, 1991

INVENTOR(S) : Erwin E. Cooper

It is certified that error appears in the above-identified patent and that said Letters Patent is hereby corrected as shown below:

ON TITLE PAGE:

Assignee: Texas Instruments Incorporated

Attorney: Rene' E. Grossman; Melvin Sharp

Signed and Sealed this

Twenty-first Day of July, 1992

*Attest:*

DOUGLAS B. COMER

*Attesting Officer*      *Acting Commissioner of Patents and Trademarks*